United States Patent
Banks et al.

(10) Patent No.: US 7,320,127 B2
(45) Date of Patent: Jan. 15, 2008

(54) CONFIGURATION SYNCHRONIZATION FOR REDUNDANT PROCESSORS EXECUTING DIFFERENT VERSIONS OF SOFTWARE

(75) Inventors: Donald Banks, San Jose, CA (US); Praveen Joshi, Sunnyvale, CA (US); Seok Anthony Koh, Fremont, CA (US); John Welder, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 745 days.

(21) Appl. No.: 10/723,684

(22) Filed: Nov. 25, 2003

(65) Prior Publication Data

US 2005/0114846 A1  May 26, 2005

(51) Int. Cl.
*G06F 9/45* (2006.01)
(52) U.S. Cl. .................................. 717/168
(58) Field of Classification Search ............. 717/168; 707/201
See application file for complete search history.

(56) References Cited

U.S. PATENT DOCUMENTS

| | | | |
|---|---|---|---|
| 5,317,722 A | 5/1994 | Evans et al. | |
| 5,983,371 A * | 11/1999 | Lord et al. | 714/55 |
| 6,014,669 A | 1/2000 | Slaughter et al. | |
| 6,108,300 A | 8/2000 | Coile et al. | 370/217 |
| 6,487,591 B1 | 11/2002 | Budhraja et al. | 709/223 |
| 6,636,873 B1 * | 10/2003 | Carini et al. | 707/201 |
| 7,178,056 B2 * | 2/2007 | Shanbhogue | 714/7 |

FOREIGN PATENT DOCUMENTS

EP  1347373  9/2003

OTHER PUBLICATIONS

Alfred v. Aho, Ravi Sethi, Jeffrey D. Ullman: "*Compilers: Principles, Techniques, and Tools,*" 1986, Addison-Wesley Publishing Company, USA, pp. 1-463.
International Search Report and Written Opinion Of The International Searching Authority dated Jun. 7, 2005, for related PCT Application No. PCT/US2004/038361.

* cited by examiner

*Primary Examiner*—John Chavis
(74) *Attorney, Agent, or Firm*—Beyer Weaver LLP

(57) ABSTRACT

Methods and devices are provided for maintaining configuration synchronization when an Active unit and a Standby unit have different versions of a software image. Preferred implementations allow the system to operate in a stateful mode even after the Standby unit has had an image upgrade. Other implementations allow the system to operate in a stateful mode when the Active unit has a higher-level version of the image than the Standby unit.

46 Claims, 6 Drawing Sheets

CONFIGURATION SYNCHRONIZATION FOR REDUNDANT PROCESSORS EXECUTING DIFFERENT VERSIONS OF SOFTWARE

BACKGROUND OF THE INVENTION

1. Field of the Invention

The present invention relates to redundant devices that share configuration requirements. More particularly, the present invention relates to maintaining high availability of network devices.

2. Description of the Related Art

Within systems configured for using redundancy, at least two processing units are required where at least one is designated the "Active unit" while at least one other is designated the "Standby unit." As used herein, a "unit" is one or more processors, line cards, etc. The role of the Standby is to take over for the Active unit should the Active unit fail, ideally without any service interruption. The Active unit is responsible for providing service and manages the configuration of the system. In order to provide the Standby capability, its view of the configuration must be kept synchronized with the view that the Active unit has at any point in time. Both the initial configuration and all subsequent changes to the configuration must be synchronized to the Standby unit.

In general, the system may be configured in a "cold," "warm" or "hot" standby state. Although these terms are not precisely defined, an increase in figurative temperature indicates a relatively higher state of readiness of the Standby unit. In general, a cold standby state refers to hardware redundancy. In case of failure during a cold standby state the network device will reset, with the Standby unit becoming Active. In a warm standby state, there is hardware redundancy and enough application redundancy so that the Network Device doesn't have to reset on a switch over. However, sessions through the network device are lost and need to restart. A hot standby state means there is hardware redundancy and enough application redundancy that upon a switchover the device is not reset and sessions through the network device are maintained through the switchover. In the context of the current invention, we are describing configuration synchronization in a system operating in a hot standby mode known as "Stateful Switchover" (SSO).

The present assignee has developed methods wherein an Active unit may be executing an image that is different from that of the Standby unit. Among other things, these methods allow the software image of a network device's Standby unit to be changed while the network device is operating without any interruption of service. Such a change provides either a newer image (i.e., an upgrade) or an older image (i.e., a downgrade) to execute on the Standby unit. The system continues to operate in an SSO (hot standby) mode during this change.

SUMMARY OF THE INVENTION

Methods and devices are provided for maintaining configuration synchronization when an Active unit and a Standby unit are executing different versions of software images. Preferred implementations allow the system to operate in a hot standby state even when the Standby unit is executing an image that is different from that executing on the Active unit.

In accordance with some aspects of the invention, a method is provided of maintaining configuration synchronization in a network device where the two images are different. The method involves the following steps: a) dynamically determining a first set of commands having a first syntax supported by a first image of an Active unit but not supported by a second image of a Standby unit; and b) transforming at least a first portion of the first set of commands into first transformed commands having a second syntax supported by the second image on the Standby unit.

The second syntax may be a lower-level syntax. The transforming step may be performed by the Active unit. The method may also involve determining a second portion of the first set of commands that cannot be transformed into the second syntax and determining whether commands of the second portion need to be synchronized to the Standby unit.

Step b) may be performed in multiple parts, each part involving a transformation between successive transformation levels. Step a) may involve the following: determining a second set of possible commands for the first image; determining a third set of possible commands for the second image; and comparing the second set to the third set to determine the first set. The method can involve determining a Standby diff list of commands supported by the second image but not by the first image. The method can include the step of synchronizing the first transformed commands to the Standby unit.

Alternative aspects of the invention also provide a method of maintaining configuration synchronization. The method includes the following steps: a) dynamically determining a first set of commands having a first syntax supported by a first image of an Active unit and supported by a second image of a Standby unit; and b) transforming at least a first portion of the first set of commands into first transformed commands having a different syntax supported by the second image. The different syntax may be a higher-level syntax. The transforming step may be performed by the Standby unit. Step b) may be performed in multiple parts, each part involving a transformation between successive transformation levels.

Other implementations of the invention provide a method of maintaining configuration synchronization between an Active unit and a Standby unit. The method includes the following steps: receiving, by the Active unit, a new command that was not previously part of an Active running configuration on the Active unit; and determining whether the new command has a first syntax that is supported by a Standby image of the Standby unit.

The method may include the step of synchronizing the command to the Standby unit if it is determined that the first syntax is supported by the Standby image. The method may involve the step of determining whether the command is transformable to a second syntax that is supported by the Standby image if it is determined that the first syntax is not supported by the Standby image.

The method can include transforming the new command to a transformed command if it is determined that the command is transformable to the second syntax that is supported by the Standby image. The method can include the step of synchronizing the transformed command to the Standby unit. If it is determined that the command is not transformable to the second syntax that is supported by the Standby image, the method may also include the step to determine whether it is permissible not to synchronize this command or whether the policy needs to be invoked to determine the appropriate corrective action.

Some embodiments of the invention provide a computer program embodied in a machine-readable medium. The computer program includes instructions for controlling at least one network device to perform the following steps: a) dynamically determining a first set of commands having a first syntax supported by a first image of an Active unit but not supported by a second image of a Standby unit; and transforming at least a first portion of the first set of commands into first transformed commands having a second syntax supported by the second image on the Standby unit. The second syntax may be a lower-level syntax. The transforming step may be performed by the Active unit.

The computer program may also include instructions for controlling at least one network device to determine a second portion of the first set of commands that cannot be transformed into the second syntax. If a second portion of the commands cannot be transformed, they will not be synchronized with the Standby unit. They will be verified against the DCL, and if found there, then after being executed on the Active, they will not be synchronized. If the command is not found in the DCL, the policy will be invoked and further actions will be determined by the outcome of the policy decision.

Step b) may be performed in multiple parts, each part involving a transformation between successive transformation levels. Step a) can include the following: determining a second set of possible commands for the first image; determining a third set of possible commands for the second image; and comparing the second set to the third set to determine the first set.

Alternative embodiments of the invention provide another computer program embodied in a machine-readable medium. The computer program includes instructions for controlling at least one network device to perform the following steps: a) dynamically determining a first set of commands having a first syntax supported by a first image of an Active unit and supported by a second image of a Standby unit; and b) transforming at least a first portion of the first set of commands into first transformed commands having a different syntax supported by the second image. The different syntax may be a higher-level syntax. The transforming step may be performed by the Standby unit.

Step b) can be performed in multiple parts, each part involving a transformation between successive transformation levels.

Yet other embodiments provide an apparatus for maintaining configuration synchronization. The apparatus includes: at least one device configured for dynamically determining a first set of commands having a first syntax supported by a first image of an Active unit but not supported by a second image of a Standby unit; and at least one device configured for transforming at least a first portion of the first set of commands into first transformed commands having a second syntax supported by the second image on the Standby unit. The second syntax can be a lower-level syntax. The transforming step may be performed by the Active unit.

The apparatus may also include at least one device configured for determining a second portion of the first set of commands that cannot be transformed into the second syntax. The apparatus can include at least one device configured for determining whether commands of the second portion need to be synchronized to the Standby unit.

Yet other embodiments of the invention provide another apparatus for maintaining configuration synchronization. The apparatus includes: at least one device configured for dynamically determining a first set of commands having a first syntax supported by a first image of an Active unit and supported by a second image of a Standby unit; and at least one device configured for transforming at least a first portion of the first set of commands into first transformed commands having a different syntax supported by the second image. The different syntax may be a higher-level syntax. The transforming step may be performed by the Standby unit. Step b) may be performed in multiple parts, each part involving a transformation between successive transformation levels.

Still other embodiments of the invention provide an apparatus for maintaining configuration synchronization. The apparatus includes at least one Active unit having a first image stored thereon, the at least one Active unit being configured to create a first list of commands supported by the first image. The apparatus also includes a Standby unit having a second image stored thereon, the Standby unit being configured to: create a second list of commands supported by the second image; determine an Active diff list of commands on the first list but not on the second list; and determine a Standby diff list of commands on the second list but not on the first list.

The Active unit or units may be further configured to generate a running configuration for the first image and determine a third list of commands that are part of the running configuration and part of the Active diff list. The Active unit or units can be further configured to synchronize the running configuration to the Standby unit when the third list is a null set.

The Active unit or units may also be configured to transform the third list of commands to the second syntax and to synchronize the transformed third list of commands to the Standby unit. The apparatus can include multiple Active units. The Standby unit can be further configured to transform commands of the synchronized running configuration to a higher-level syntax.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

Cisco Systems, Inc., has developed methods and devices that allow different versions of operating system images to run on the Active and Standby units of a network device. One such method, known as In-Service Software Upgrade ("ISSU") does so by checking for compatibility when the Standby joins the configuration and by negotiation between stateful clients during operation. Some aspects of ISSU are described, for example, in U.S. patent application Ser. Nos. 10/156,563 and 10/156,556, which are hereby incorporated by reference for all purposes. Although some preferred implementations of the invention involve ISSU, the present invention is not limited to use with ISSU.

Figure 1:
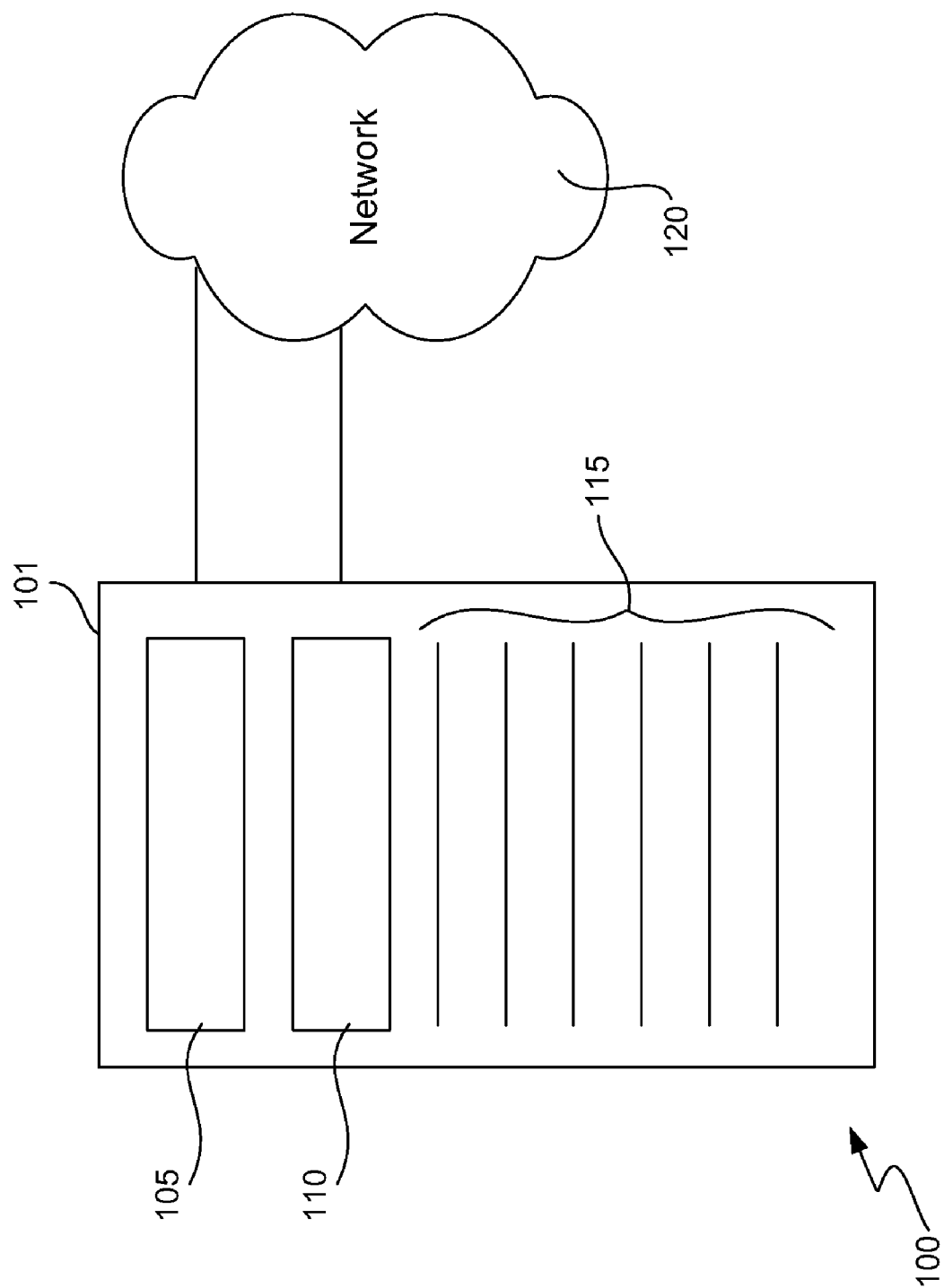
FIG. 1 is a diagram illustrating a network device having an Active unit and a Standby unit.

FIG. 1 illustrates network device 100 having Active unit 105 and Standby unit 110 within chassis 101. Because network device 100 includes more than one unit, a unit so configured is sometimes referred to herein as "redundant." Network device 100 also includes a number of line cards 115. Active unit 105 is responsible for providing service for the router.

Standby unit 110 takes over when Active unit 105 fails. Preferably, Standby unit is kept in a "hot" standby state, thereby allowing for a stateful switchover when Active unit 105 fails. The configuration states of Standby unit 110 and Active unit 105 must remain synchronized in order to permit a stateful switchover when Active unit 105 fails. Such synchronization can be problematic if, for example, a more recent version of the operating system image has been installed on the Standby unit. To further complicate matters, the configuration state of the Active unit may be modified while the Active unit is in operation.

According to some preferred implementations of the invention, the synchronization process occurs in two distinct phases. First, during Standby initialization and progression towards a "Hot Standby" state, the bulk configuration synchronization or "bulk config sync" process is triggered, during which the running configuration is synchronized from the Active unit. This may be accomplished, for example, by copying the running configuration to a designated RAM location in the Standby unit.

According to preferred implementations, all possible commands that could be implemented in a unit are collected by traversing all statically defined parse nodes and storing the result of the "command line interface ("CLI") dump" in a buffer. The output buffer then reflects a snapshot of the current parser chains for the image on the unit. By comparing the results of the CLI dump of the Standby unit and the Active unit, it is determined (preferably by the Standby unit) what commands are available on the Active unit but not on the Standby unit and vice versa. As described in detail below, one comparison is used when the Active unit is running the higher-level version of the command(s). This comparison is the basis for determining what commands must be transformed before they are synchronized to the Standby unit. These commands are transformed into a lower-level syntax prior to synchronization. Other commands are synchronized to the Standby unit and then may be transformed to a higher-level syntax. This situation will occur when the Standby unit is running the higher-level version of the command(s).

After the bulk config sync has completed, the Active unit's configuration state will often change while the network device is in operation. Therefore, it is necessary to maintain the Standby unit in a "hot" Standby condition via an ongoing line-by-line synchronization process.

Figure 2:
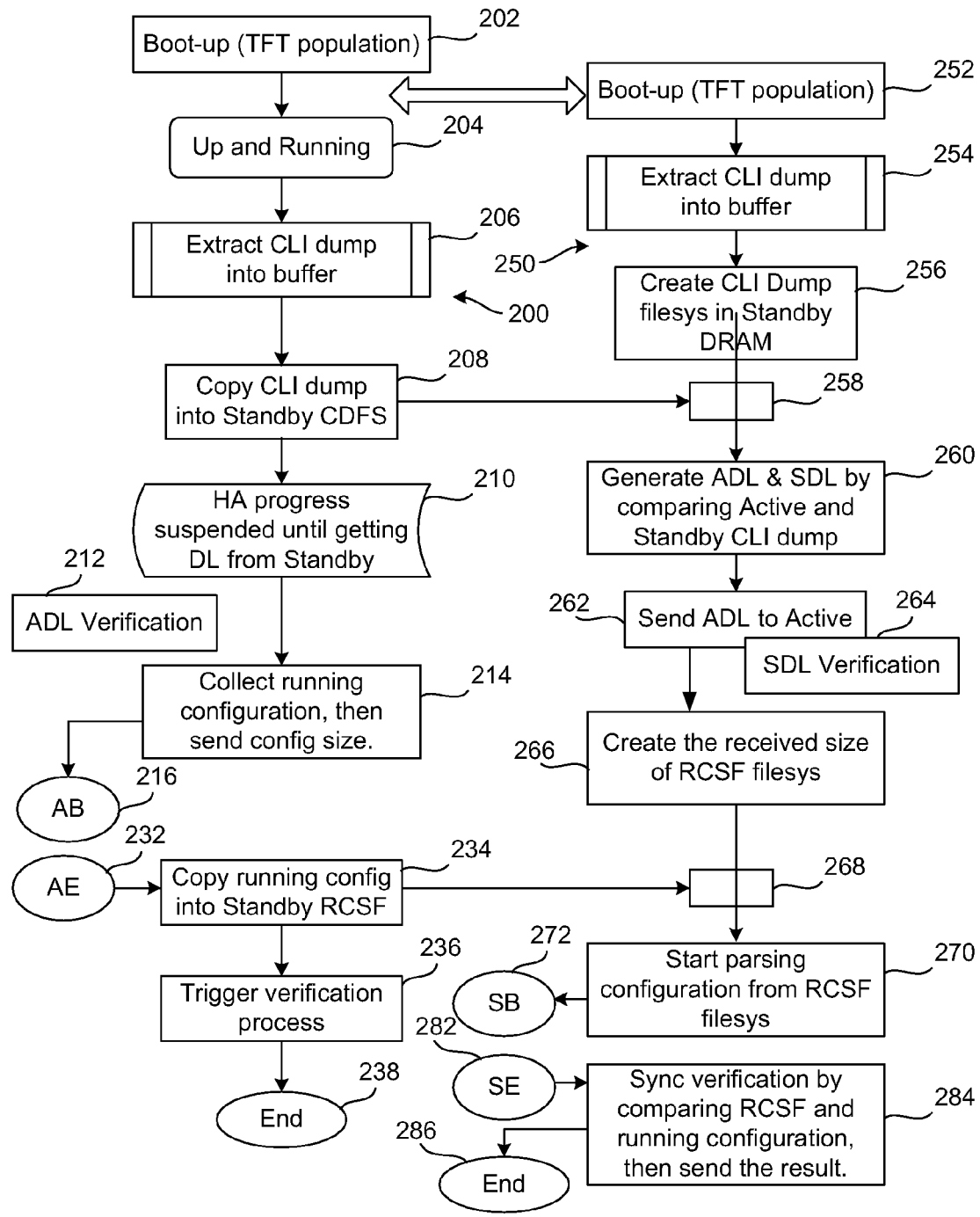
FIG. 2 is a flow chart that outlines a bulk configuration synchronization process.
Figure 3A:
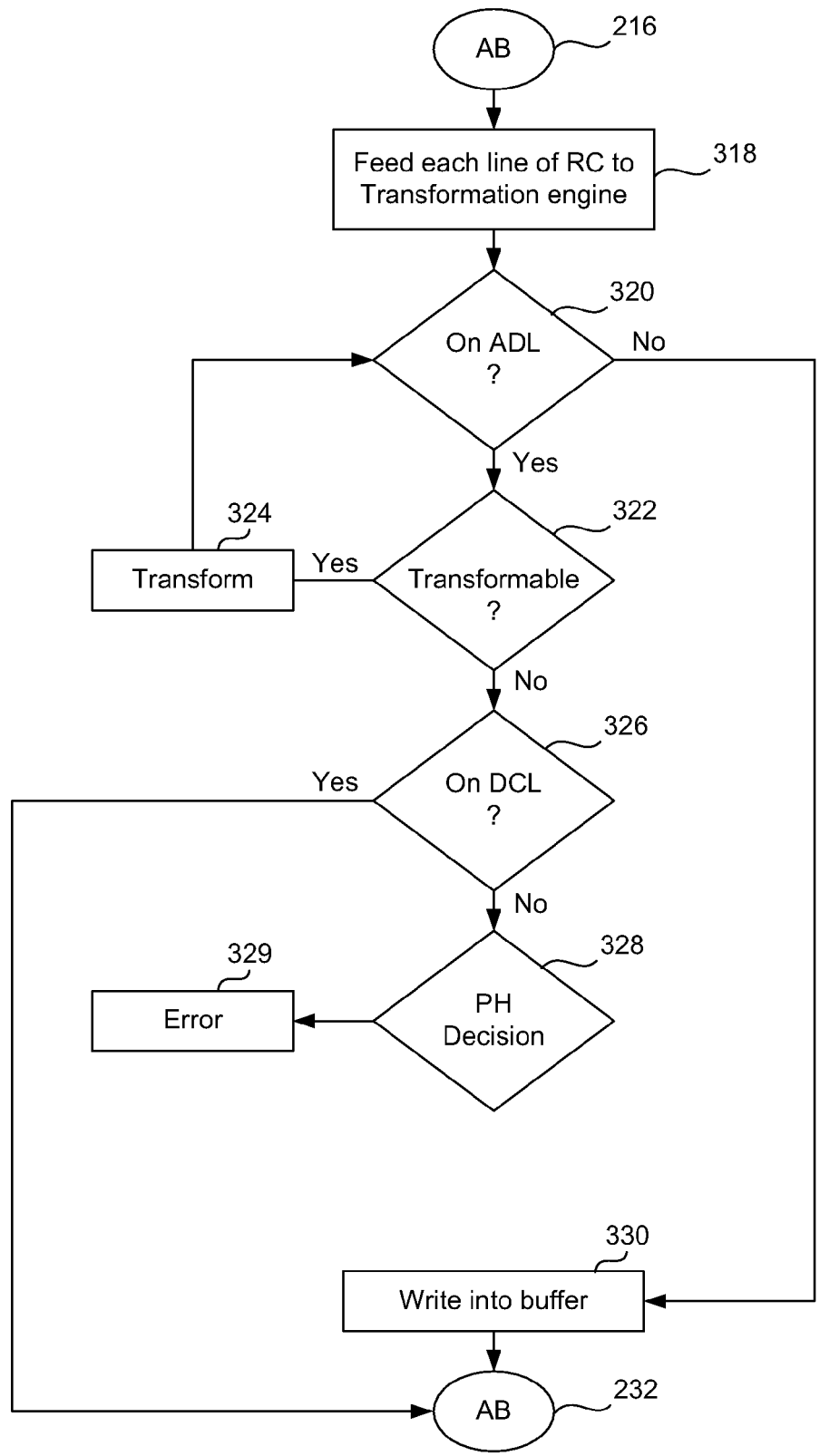
FIGS. 3A and 3B are flow charts that indicate details of a bulk configuration synchronization process.
Figure 3B:
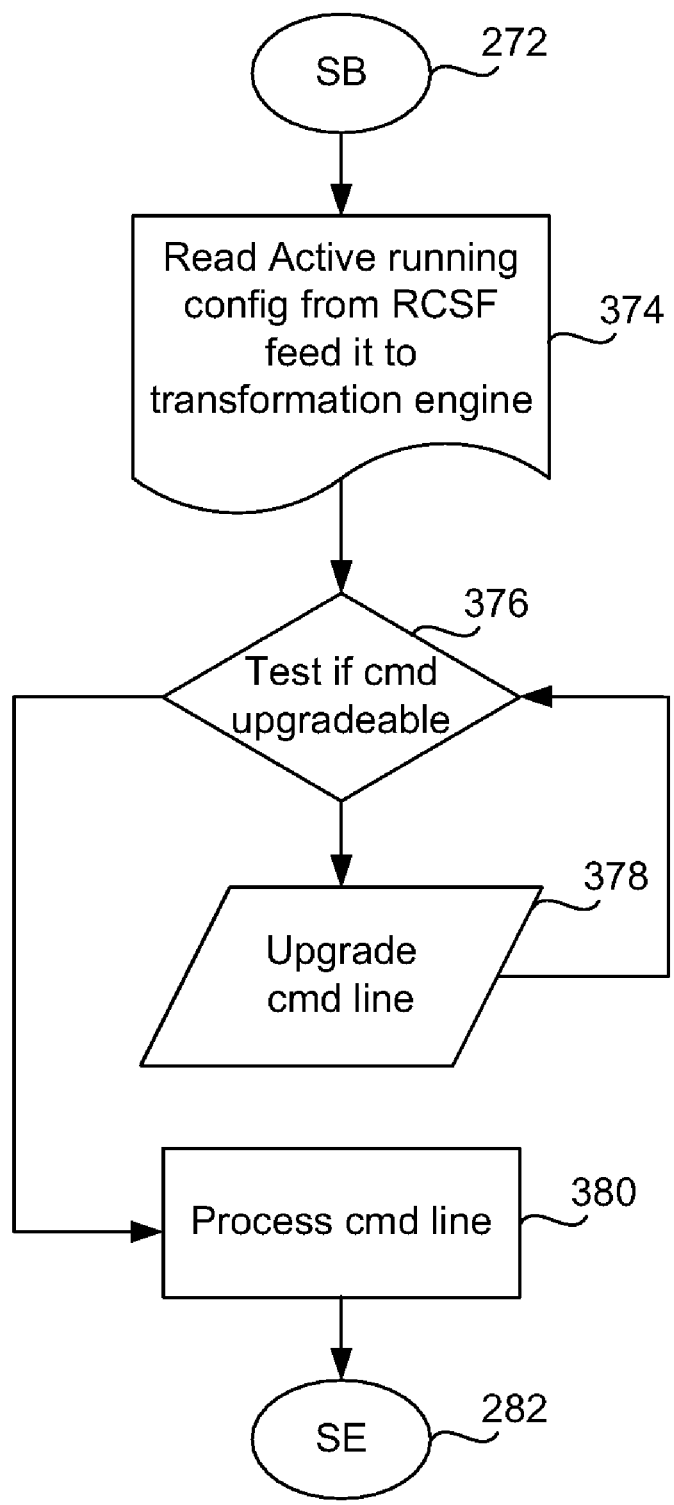

FIGS. 2, 3A and 3B are flow charts that illustrate a bulk configuration synchronization (a/k/a "bulk config sync") process according to some implementations of the invention. During the bulk config sync, the Standby unit will receive the running configuration file of the Active unit, which will be used for configuring the Standby unit. The left-hand portions of FIG. 2 indicate functions 200 of the Active unit and the right-hand portions indicate functions 250 of the Standby unit during the bulk config sync.

In steps 202 and 252, the Active unit and Standby unit initialize. The Active unit progresses to an "Active" state while the Standby unit is halted during its initialization until the Active has reached the Active state, so that the Active unit is up and running (step 204) while the Standby unit is stopped during initialization waiting for the Active to signal it to proceed. During the initialization process, all possible configuration commands that could be implemented in each unit are collected by traversing all statically defined parse nodes, thereby creating a list of all possible CLI commands supported by that unit, referred to herein as a "CLI dump."

All commands under all modes (except the "exec" mode) are collected under one mode "global config mode," because individual configuration commands are unique across whole CLIs. In this CLI collection process, a binary tree created in Active is filled with all commands generated during parse chain traversal to remove any redundant entries. Then, all commands are dumped into a buffer and written into a DRAM placeholder that is physically located in Standby unit, so that the Active CLI dump can be read by Standby unit.

Meanwhile, a binary tree is also created in Standby unit by going through the same process. Each line of commands from the Active CLI dump is traversed through Standby binary tree searching for the same entry. If a command is not found, then that command is entered into a "Diff List," which is to be conveyed to the Active unit.

Preferred implementations also involve the creation of a transformation function table ("TFT") by the Active unit and Standby unit during config sync initialization. According to some such implementations, the TFT is a skip list that is programmatically filled with function pointers for upgrading or downgrading commands by each component when the parse chain is initialized. Each pre-programmed function can either upgrade or downgrade a command. The caller decides whether to call the functions and the functions innately will upgrade or downgrade as they have been defined. Accordingly, during steps 202 and 252 of this exemplary implementation, the Active unit and Standby unit initialize parse chains and populate their respective TFTs with function pointers for upgrade and downgrade functions.

In some implementations of steps 206 and 254, both units extract their respective CLI dump outputs into separate buffers. In some implementations, the Standby CLI dump remains in a binary tree format. The Active unit also sends information to the Standby unit indicating the size of the Active unit's CLI dump output. In step 256, the Standby unit creates a file, referred to herein as a CLI dump file system or "filesys" ("CDFS"), in a memory accessible by the Standby unit (e.g., in the Standby unit's DRAM area). In steps 208 and 258, the Active unit copies its CLI dump into the Standby unit's CDFS. The Active unit then suspends the HA initialization process pending the receipt of further information from the Standby unit.

In step 260, the Standby unit compares the CLI dumps from the Active and the Standby unit by comparing the contents of the CDFS with its own CLI dump output, which is stored in a binary tree format in this example. In alternative embodiments, this computation is performed by another portion of the network device. During this step, the Standby unit determines a list of commands that are available on the Active unit, but not on the Standby unit. This list is called the Active diff list ("ADL"). The ADL is used to identify the commands that cannot be successfully executed on the Standby if those commands are synced directly without modification: the commands on the ADL must be either converted into a format executable on the Standby unit before being synced, or these commands cannot be synced at all.

Some commands may be deleted in the Standby image but still be supported by the Active image. Some commands may be newly created on the Active unit, but not yet supported by the Standby. This group of commands cannot be transformed in order to make them work, so they can't be synced to the Standby. According to preferred implementations, a don't care list ("DCL") is pre-populated with the command entries that can be available only in the Active unit and that don't need to be synced to the Standby unit.

In step 260, the Standby unit also determines an "SDL" (Standby diff list), which is a list of commands that are available on the Standby unit but not on the Active unit. The SDL is used to verify that the appropriate transformation functions are registered for those commands on the Standby that are not part of the Standby unit's DCL and are not part of the Active's CDFS. If transformation functions for upgrading/downgrading commands for these commands are not registered, then the two images loaded on the Active and Standby are declared to be incompatible (e.g., ISSU incompatible). The operating mode is downgraded to a non-stateful redundant mode.

In step 262, the Standby unit sends the ADL to the Active unit, which verifies the ADL in step 212. The Standby unit verifies the SDL in step 264. As part of this verification process, each entry of each DL is run through a TFT to determine whether a matching transformation function is registered.

In step 214, the Active unit collects its running configuration and sends information to the Standby unit indicating the file size of the transformed running configuration. In step 266, the Standby unit creates a file (here, the "RCSF filesys"), based in part on the file size information, into which the Active unit's running configuration will be copied.

In steps 216 through 232, commands of the running configuration are transformed, if necessary. If a matching entry for a command of the running configuration is found in the ADL, then that line of the running configuration is fed to a at least one transformation function that downgrades the command version. This transformation process is repeated until either (1) the output command from the transformation is found to be one that is executable on the Standby, or (2) the system determines that the command is incompatible. If the command is incompatible, the system preferably changes the operating mode to a non-stateful mode or places the system in a non-redundant mode and resets the Standby unit. This process is illustrated in FIG. 3A.

In step 318, the Active unit feeds each line of the collected running configuration into a bulk config sync transformation engine. In step 320, each command of the running configuration is compared to the ADL to determine whether there is a match. If there is no match, this means that the command is usable by the Standby unit. Therefore, the command is written to an output buffer (step 330) and the process continues to step 232.

If a match is found in step 320, this means that the command is not usable by the Standby unit. The process continues to step 322, in which the Active unit determines whether the command is transformable. If so, the command is downgraded in step 324.

Preferably, a command is transformed one level at a time rather than being directly converted to the target format in one pass. For example, suppose that cmd_x is upgraded to cmd_y and then cmd_z across multiple releases of an operating system image. In an upgrade scenario, cmd_x is converted first to cmd_y and then to cmd_z; cmd_x is not directly transformed to cmd_z. Thus, all configuration commands executed on the Active unit are synced to the Standby unit as either downgraded or unchanged from what they were on the Active unit.

When a command is downgraded, the output of the transformed command could be different from that of originally entered command. To address this potential problem, a Parser Return Code ("PRC") is supported for such transformed command, so that the result of the execution on the Standby can be verified. A downgrade situation occurs when a higher (later) version of an image is running on the Active unit, so that some commands that are configurable on the Active unit are not valid on the Standby unit. Therefore, those commands must be either transformed into the lower version that is configurable on the Standby unit or the commands should not be synced.

If the command is not transformable, the Active unit determines whether the command is on its "don't care list" in step 326. If so, the command does not need to be (and therefore is not) synced.

If the command is not on the DCL, a policy handler is invoked (step 328). This situation will not occur unexpectedly because any case which would cause such an error will be known and published before the image is shipped. The policy handler may be, for example, software that invokes a set of rules. If the policy handler determines that the command is important but cannot be synced, then in some implementations the command will be dropped, an "out of sync" state will be declared and an error will be reported, as indicated in step 329. The command is not written to the output buffer or used to sync the Standby. The Standby will be reset and the system will either return either in a non-redundant configuration or in a non-stateful operating mode. The process then continues to step 328.

However, if the process shown in FIG. 3A completes normally, the method continues with steps 234 and 268 of FIG. 2. Here, the Active unit copies its transformed running configuration into the file prepared by the Standby unit (here, "CDFS filesys"), which may be located in the Standby unit's DRAM.

In an upgrade scenario, a higher version of the command is supported on the Standby unit, so an upgrade conversion occurs in the Standby context. That is, the Standby unit supports a later version of a command than the image synced from the Active unit. If the Standby is running a more recent image version, each command line is then processed through the TFT to see if it can be upgraded further. The command is then executed on the Standby.

One such command upgrading process is depicted by the flow chart of FIG. 3C. In step 374, the Standby unit reads each line of the running configuration file received from the Active unit (here, by reading the RCSF) and sends each line to an upgrade transformation engine. In step 376, the Standby unit determines whether the command is transformable (in this example, whether the command can be upgraded). If so, the command is transformed (here, upgraded) in step 378. Steps 376 and 378 are repeated until there is no upgrade transformation function available in the Standby unit's TFT. At that time, the command is determined not to be further transformable and the command line is processed in step 380.

After the Standby unit has processed all command lines of the RCSF, a verification process is triggered in step 284 (see FIG. 2) to determine whether all parsed commands are configured correctly. Step 284 insures that there is not a configuration mismatch due to running different versions of images on the Active and Standby units.

Line-by-Line Config Sync

Figure 4:
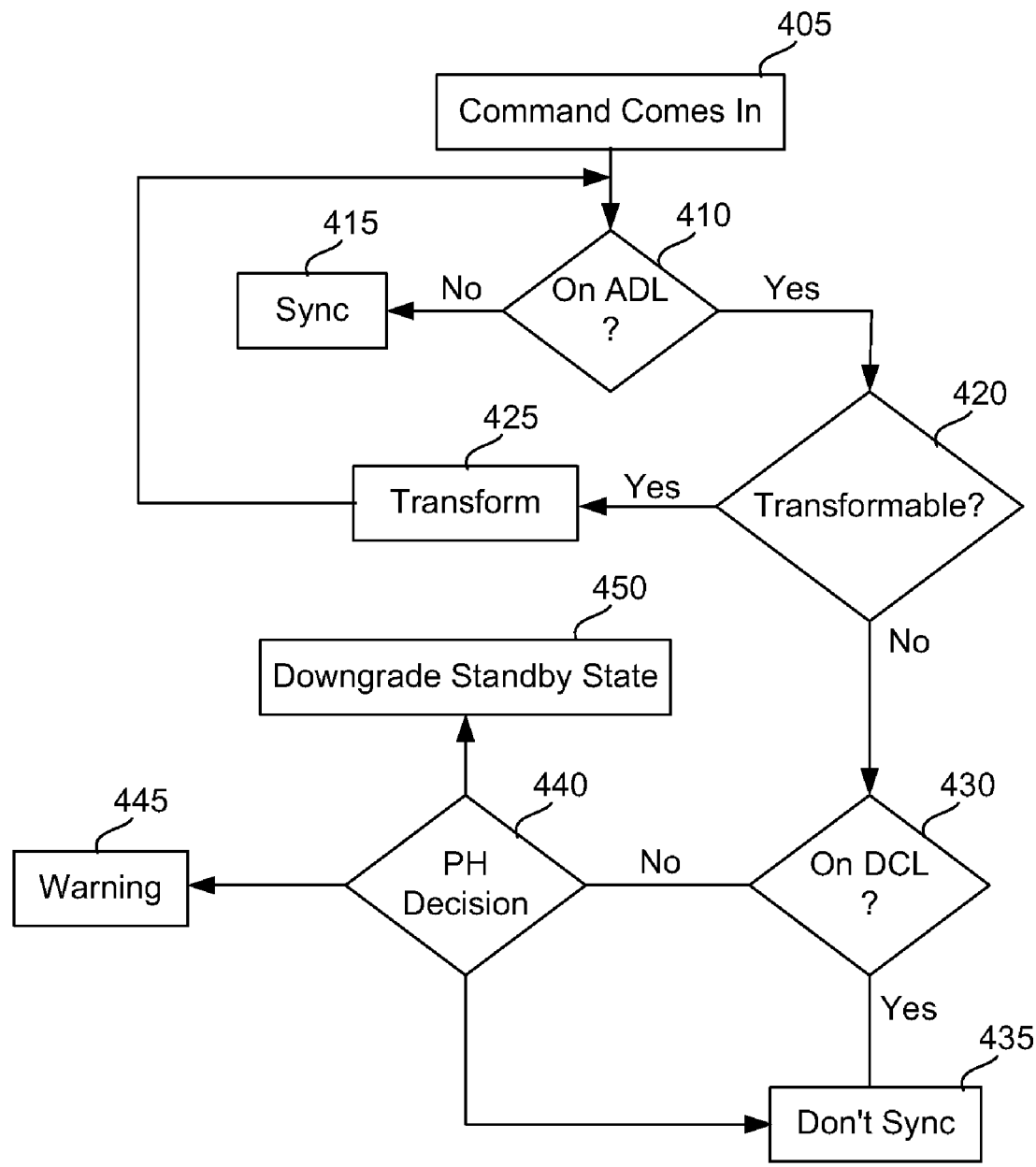
FIG. 4 is a flow chart that outlines a line-by-line configuration synchronization process.

After the bulk config sync has completed and the network device is functioning normally, the image running on the Standby unit must be updated to keep it synchronized with that of the Active unit whenever a configuration change takes place on the Active. This process is illustrated in FIG. 4.

In step 405, a new command comes in from the Active unit. In step 410, it is determined whether the command is on the ADL. If not, the new command is synchronized in step 415. If so, it is determined whether the command is transformable (step 420). If the command is transformable, it is transformed in step 425. The process then returns to step 410, wherein the transformed command is evaluated to determine whether it is on the ADL.

If the command is not transformable, it is compared to the DCL (step 430). If the command is on the DCL, the command is not synced (step 435). If the command is not on the DCL, the policy handler is invoked (step 440) and the command is not synced. Other consequences will ensue according to the decisions of the policy handler. For example, the command could merely be dropped and a warning issued, as indicated by step 445. Alternatively, the standby state could be downgraded, as shown in step 450.

Figure 5:
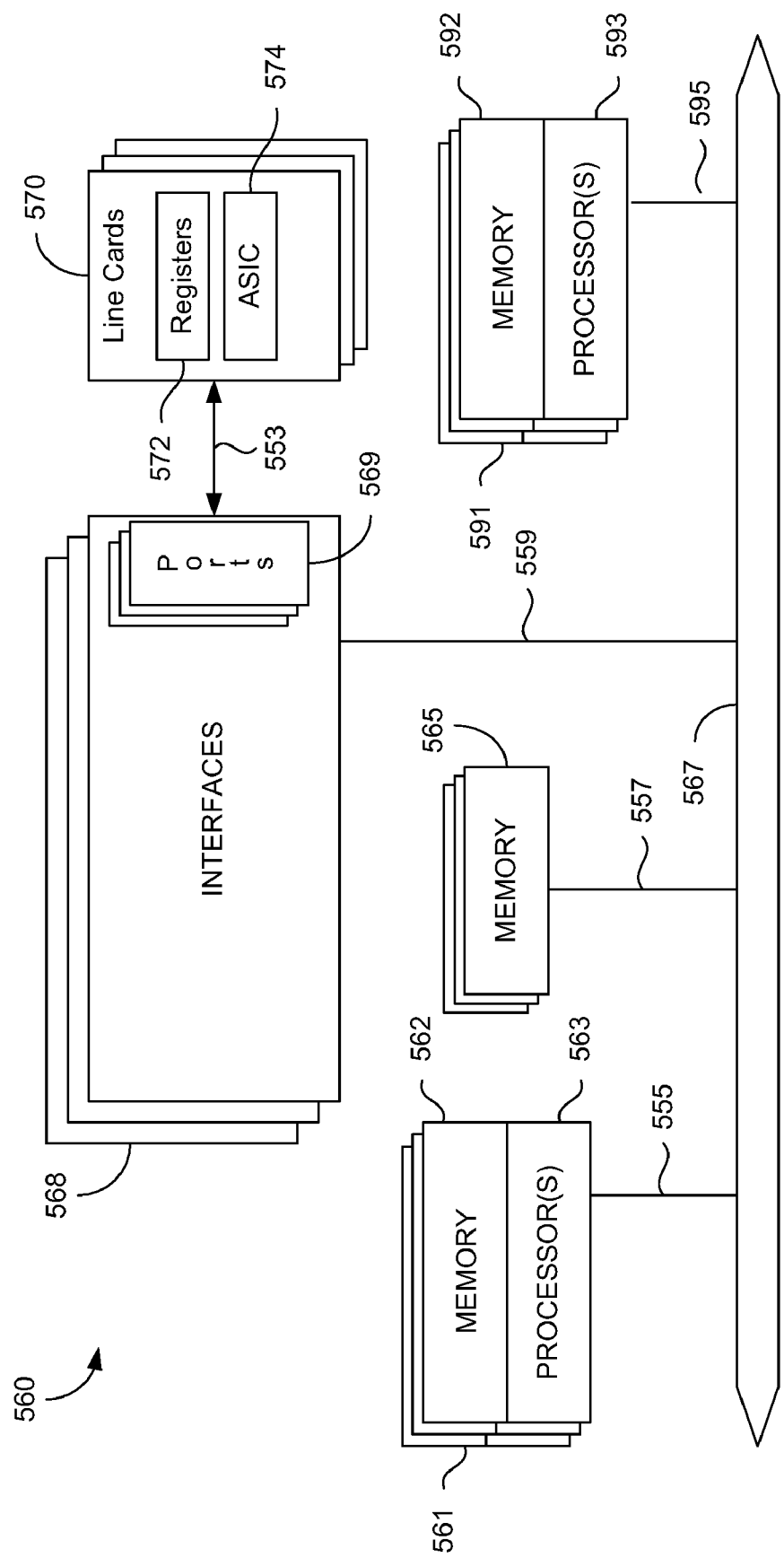
FIG. 5 illustrates a simplified version of a network device that may be configured to implement some aspects of the present invention.

FIG. 5 illustrates an example of a network device that may be configured to implement some methods of the present invention. Network device 560 includes an Active central processing unit (CPU) 562, Standby CPU 592, interfaces 568, and a bus 567 (e.g., a PCI bus). Generally, interfaces 568 include ports 569 appropriate for communication with the appropriate media. In some embodiments, one or more of interfaces 568 includes at least one independent processor 574 and, in some instances, volatile RAM. Independent processors 574 may be, for example ASICs or any other appropriate processors.

According to some such embodiments, these independent processors 574 perform at least some of the functions of the logic described herein. In some embodiments, one or more of interfaces 568 control such communications-intensive tasks as media control and management. By providing separate processors for the communications-intensive tasks, interfaces 568 allow the Active CPU 562 efficiently to perform other functions such as routing computations, network diagnostics, security functions, etc.

The interfaces 568 are typically provided as interface cards (sometimes referred to as "linecards"). Generally, interfaces 568 control the sending and receiving of data packets over the network and sometimes support other peripherals used with the network device 560. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention Active CPU 562 and Standby CPU 592 may be responsible for implementing specific functions associated with the functions of a desired network device as described in this application. According to some embodiments, Active CPU 562 and Standby CPU 592 accomplish all these functions under the control of software including an operating system (e.g., Cisco IOS, a proprietary operating system developed by Cisco Systems, Inc., etc.) and any appropriate applications software.

CPU 562 may include one or more processors 563 such as a processor from the Motorola family of microprocessors or the MIPS family of microprocessors. In an alternative embodiment, processor 563 is specially designed hardware for controlling the operations of network device 560. In a specific embodiment, a memory 561 (such as non-volatile RAM and/or ROM) also forms part of CPU 562. However, there are many different ways in which memory could be coupled to the system. Memory block 561 may be used for a variety of purposes such as, for example, caching and/or storing data, programming instructions, etc. Similarly, Standby CPU 592 may include one or more processors 593 and memory block 591.

Regardless of network device's configuration, it may employ one or more memories or memory modules (such as, for example, memory block 565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 5 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/linecards may be bus based (as shown in FIG. 5) or switch fabric based (such as a cross-bar).

OTHER EMBODIMENTS

Generally, the techniques of the present invention may be implemented on software, hardware, firmware and/or microcode. For example, they can be implemented in operating system kernels, in separate user processes, in library packages bound into network applications, on a specially constructed machine, or on network interface cards. In all cases, these processing units must be paired in a redundant relationship. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, the network device described above with reference to FIG. 5. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Although illustrative embodiments and applications of this invention are shown and described herein, many variations and modifications are possible which remain within the concept, scope, and spirit of the invention, and these variations would become clear to those of ordinary skill in the art after perusal of this application.

For example, the methods of the present invention can be implemented in a 1:1 or 1:N processing unit relationship. In other words, there may be a single Active unit or multiple Active units having a single standby.

Accordingly, the present embodiments are to be considered as illustrative and not restrictive, and the invention is not to be limited to the details given herein, but may be modified within the scope and equivalents of the appended claims.

We claim:

1. A method of maintaining configuration synchronization, the method comprising:
   a) dynamically determining a first set of commands having a first syntax supported by a first image of an Active unit but not supported by a second image of a Standby unit; and
   b) receiving a command from the first set of commands;
   c) applying the command from the first set of commands to the Active unit;
   d) transforming the command from the first set of commands into a first transformed command having a second syntax supported by the second image on the Standby unit; and
   e) sending the transformed command to the Standby unit to be applied.

2. The method of claim 1, wherein the second syntax is a lower-level syntax.

3. The method of claim 1, wherein the transforming step is performed by the Active unit.

4. The method of claim 1, further comprising: f) determining a second portion of the first set of commands that cannot be transformed into the second syntax.

5. The method of claim 4, further comprising: g) determining whether commands of the second portion need to be synchronized to the Standby unit.

6. The method of claim 1, wherein step d) is performed in multiple parts, each part involving a transformation between successive transformation levels.

7. The method of claim 1, wherein step a) comprises:
   determining a second set of possible commands for the first image;
   determining a third set of possible commands for the second image; and
   comparing the second set to the third set to determine the first set.

8. The method of claim 1, further comprising determining a Standby diff list of commands supported by the second image but not by the first image.

9. The method of claim 1, further comprising the step of synchronizing the first transformed commands to the Standby unit.

10. A method of maintaining configuration synchronization, the method comprising:
    a) dynamically determining a first set of commands having a first syntax supported by a first image of an Active unit and supported by a second image of a Standby unit;
    b) receiving a command from the first set of commands;
    c) applying the command from the first set of commands to the Active unit;
    d) transforming the command from the first set of commands into a first transformed command having a different syntax supported by the second image; and
    e) sending the transformed command to the Standby unit to be applied.

11. The method of claim 10, wherein the different syntax is a higher-level syntax.

12. The method of claim 10, wherein the transforming step is performed by the Standby unit.

13. The method of claim 10, wherein step b) is performed in multiple parts, each part involving a transformation between successive transformation levels.

14. A method of maintaining configuration synchronization between an Active unit and a Standby unit, the method comprising:
    receiving, by the Active unit, a new command that was not previously part of an Active running configuration on the Active unit; and
    determining whether the new command has a first syntax that is supported by a Standby image of the Standby unit.

15. The method of claim 14, further comprising the step of synchronizing the command to the Standby unit if it is determined that the first syntax is supported by the Standby image.

16. The method of claim 14, further comprising the step of determining whether the command is transformable to a second syntax that is supported by the Standby image when it is determined that the first syntax is not supported by the Standby image.

17. The method of claim 16, further comprising the step of transforming the new command to a transformed command when it is determined that the command is transformable to the second syntax that is supported by the Standby image.

18. The method of claim 16, further comprising the step of determining whether the command needs to be synchronized to the Standby unit when it is determined that the command is not transformable to the second syntax that is supported by the Standby image.

19. The method of claim 17, further comprising the step of synchronizing the transformed command to the Standby unit.

20. The method of claim 18, further comprising the step of invoking a policy function when it is determined that the command is not transformable to the second syntax that is supported by the Standby image.

21. A machine storage medium comprising a computer program, the computer program comprising instructions for controlling at least one network device to perform the following steps: a) dynamically determining a first set of commands having a first syntax supported by a first image of an Active unit but not supported by a second image of a Standby unit; and b) transforming at least a first portion of the first set of commands into first transformed commands having a second syntax supported by the second image on the Standby unit.

22. The machine storage medium of claim 21, wherein the second syntax is a lower-level syntax.

23. The machine storage medium of claim 21, wherein the transforming step is performed by the Active unit.

24. The machine storage medium of claim 21, further comprising instructions for controlling the at least one network device to perform the following step: f) determining a second portion of the first set of commands that cannot be transformed into the second syntax.

25. The machine storage medium of claim 21, further comprising instructions for controlling the at least one network device to perform the following step: g) determining whether commands of the second portion need to be synchronized to the Standby unit.

26. The machine storage medium of claim 21, wherein step b) is performed in multiple parts, each part involving a transformation between successive transformation levels.

27. The machine storage medium of claim 21, wherein step a) comprises: determining a second set of possible commands for the first image; determining a third set of possible commands for the second image; and comparing the second set to the third set to determine the first set.

28. A machine storage medium comprising a computer program, the computer program comprising instructions for controlling at least one network device to perform the following steps: a) dynamically determining a first set of commands having a first syntax supported by a first image of an Active unit and supported by a second image of a Standby unit; and b) transforming at least a first portion of the first set of commands into first transformed commands having a different syntax supported by the second image.

29. The machine storage medium of claim 28, wherein the different syntax is a higher-level syntax.

30. The computer program machine storage medium of claim 28, wherein the transforming step is performed by the Standby unit.

31. The machine storage medium of claim 28, wherein step b) is performed in multiple parts, each part involving a transformation between successive transformation levels.

32. An apparatus comprising a processor for maintaining configuration synchronization, the apparatus comprising: means for dynamically determining a first set of commands having a first syntax supported by a first image of an Active unit but not supported by a second image of a Standby unit; and means for transforming at least a first portion of the first set of commands into first transformed commands having a second syntax supported by the second image on the Standby unit.

33. The apparatus of claim 32, wherein the second syntax is a lower-level syntax.

34. The apparatus of claim 32, wherein the transforming step is performed by the Active unit.

35. The apparatus of claim 32, further comprising means for determining a second portion of the first set of commands that cannot be transformed into the second syntax.

36. The apparatus of claim 32, further comprising means for determining whether commands of the second portion need to be synchronized to the Standby unit.

37. An apparatus comprising a processor for maintaining configuration synchronization, the apparatus comprising: means for dynamically determining a first set of commands having a first syntax supported by a first image of an Active unit and supported by a second image of a Standby unit; and means for transforming at least a first portion of the first set of commands into first transformed commands having a different syntax supported by the second image.

38. The apparatus of claim 37, wherein the different syntax is a higher-level syntax.

39. The apparatus of claim 37, wherein the transforming step is performed by the Standby unit.

40. The apparatus of claim 37, wherein the transforming of the command is performed in multiple parts, each part involving a transformation between successive transformation levels.

41. An apparatus comprising a processor for maintaining configuration synchronization, the apparatus comprising: at least one Active unit having a first image stored thereon, the at least one Active unit being configured to create a first list of commands supported by the first image; a Standby unit having a second image stored thereon, the Standby unit being configured to: create a second list of commands supported by the second image; determine an Active diff list of commands on the first list but not on the second list; and determine a Standby diff list of commands on the second list but not on the first list.

42. The apparatus of claim 41, wherein the at least one Active unit is further configured to:
   generate a running configuration for the first image; and
   determine a third list of commands that are part of the running configuration and part of the Active diff list.

43. The apparatus of claim 41, wherein the at least one Active unit is further configured to synchronize the running configuration to the Standby unit when a third list is a null set.

44. The apparatus of claim 43, wherein the Standby unit is further configured to transform commands of the synchronized running configuration to a higher-level syntax.

45. The apparatus of claim 41, wherein the Active unit is further configured to:
   transform a third list of commands to the second syntax; and
   synchronize the transformed third list of commands to the Standby unit.

46. The apparatus of claim 41, wherein the apparatus comprises multiple Active units.

* * * * *